(12) United States Patent
Bedwell

(10) Patent No.: US 10,473,264 B1
(45) Date of Patent: Nov. 12, 2019

(54) HANDLE HOLDER APPARATUS AND METHOD

(71) Applicant: Ken Bedwell, Cantonment, FL (US)

(72) Inventor: Ken Bedwell, Cantonment, FL (US)

( * ) Notice: Subject to any disclaimer, the term of this patent is extended or adjusted under 35 U.S.C. 154(b) by 0 days.

(21) Appl. No.: 15/928,234

(22) Filed: Mar. 22, 2018

Related U.S. Application Data

(60) Provisional application No. 62/474,745, filed on Mar. 22, 2017.

(51) Int. Cl.
*E04H 12/22* (2006.01)
*F16M 13/02* (2006.01)
*A63B 55/10* (2006.01)
*A63B 102/32* (2015.01)
*A63B 71/02* (2006.01)

(52) U.S. Cl.
CPC .............. *F16M 13/02* (2013.01); *A63B 55/10* (2013.01); *A63B 71/023* (2013.01); *A63B 2102/32* (2015.10); *E04H 12/22* (2013.01); *E04H 12/2246* (2013.01)

(58) Field of Classification Search
USPC .... 248/530, 532, 910, 346.2; 211/70.2, 70.6
See application file for complete search history.

(56) References Cited

U.S. PATENT DOCUMENTS

| | | | | |
|---|---|---|---|---|
| 187,337 A | * | 2/1877 | Thompson | |
| 1,736,177 A | * | 11/1929 | Snook | A47B 37/04 108/50.12 |
| 2,209,504 A | * | 7/1940 | Beiter | E04H 12/2223 135/118 |
| 2,738,941 A | * | 3/1956 | Laurich | A47G 29/1216 248/145 |
| 4,145,044 A | * | 3/1979 | Wilson | A63B 63/083 248/188.1 |
| 5,014,643 A | * | 5/1991 | Huang | B60C 23/0496 116/272 |
| 5,169,111 A | * | 12/1992 | Dunaj | A45B 25/24 248/523 |
| 5,465,677 A | * | 11/1995 | Alter | B63B 21/50 114/230.1 |
| 5,775,513 A | * | 7/1998 | Anthony | A63B 55/00 206/315.3 |
| 5,881,495 A | * | 3/1999 | Clark | A01G 9/12 135/118 |
| 8,177,185 B2 | * | 5/2012 | Priegel | G09F 17/00 135/16 |
| 8,371,319 B2 | * | 2/2013 | Meibos | A45B 23/00 108/50.12 |
| 10,134,312 B2 | * | 11/2018 | Guinn | G09F 23/00 |

(Continued)

*Primary Examiner* — Alfred J Wujciak
(74) *Attorney, Agent, or Firm* — J. Nevin Shaffer, Jr.

(57) ABSTRACT

A handle holder apparatus and method includes a first holder with a top and a bottom and an inside and an outside and a first dimension. A second holder is provided where the second holder includes a top and a bottom and an inside and an outside and a second dimension where the second dimension is smaller than the first dimension of the first holder and where the second holder is connected to the first holder on the inside of the first holder and where the second holder is configured to removably retain a handle on the inside of the second holder. Further, the bottom of the second holder extends beyond the bottom of the first holder.

15 Claims, 2 Drawing Sheets

(56) References Cited

U.S. PATENT DOCUMENTS

2005/0189005 A1* 9/2005 Smith ................. E04H 12/2246
                                                  135/16
2015/0197902 A1* 7/2015 Yeghiayan .......... E04H 12/2215
                                                  248/545

* cited by examiner

HANDLE HOLDER APPARATUS AND METHOD

CROSS REFERENCE TO RELATED APPLICATION

This application claims the benefit of previously filed U.S. provisional patent application No. 62/474,745 filed Mar. 22, 2017 for a "Handle Holder Apparatus and Method". The Applicant hereby claims the benefit of this provisional application under 35 U.S.C. § 119. The entire content of this provisional application is incorporated herein by this reference.

FIELD OF THE DISCLOSURE

The present invention pertains to a handle holder apparatus and method. According to a preferred embodiment a handle holder apparatus and method includes a first holder with a top and a bottom and an inside and an outside and a first dimension. A second holder is provided where the second holder includes a top and a bottom and an inside and an outside and a second dimension where the second dimension is smaller than the first dimension of the first holder and where the second holder is connected to the first holder on the inside of the first holder and where the second holder is configured to removably retain a handle on the inside of the second holder. Further, the bottom of the second holder extends beyond the bottom of the first holder.

BACKGROUND OF THE INVENTION

Handles are useful in many areas of work and play making the task of using a device easier and more efficient. Handles, however, can create problems as well. Stepping on a rake with a handle is good for comedic relief but can be painful. In many businesses rakes, for example only and not by way of limitation, are provided for the proper maintenance of a facility. Again for example only and not by limitation, sand rakes are provided on golf courses to properly maintain the sand trap after use. The state of the art is to leave the rake on the ground, preferably but not reliably, next to the sand trap for use by the next victim of an errant shot. Sometimes the rough is so high the rake disappears and other times rakes left unattended are unseen by maintenance personnel mowing the course and are run over and damaged or destroyed. This increased cost is not a welcome event.

Thus, there is a need in the art for a device that, among other things as described more fully hereafter, removes the possibility of loss or destruction of handles and that is easy to install, maintain and re-locate if desired and as needed.

It therefore is, inter alia, an object of this invention to provide a handle holder device for holding a handle in an easily accessible manner, that is easy to install and maintain and is economical.

SUMMARY

Accordingly, the handle holder apparatus and method, according to a preferred embodiment, of the present invention includes a first holder with a top and a bottom and an inside and an outside and a first dimension. A second holder is provided where the second holder includes a top and a bottom and an inside and an outside and a second dimension where the second dimension is smaller than the first dimension of the first holder and where the second holder is connected to the first holder on the inside of the first holder and where the second holder is configured to removably retain a handle on the inside of the second holder. Further, the bottom of the second holder extends beyond the bottom of the first holder.

All terms used herein are given there common meaning. Thus, "holder" describes a device for securing something else in a desired location. "Dimension" is used as is known to describe the parameters of a structure such that if the form is cylindrical the dimension may be expressed as the diameter of the structure, for example only.

In one aspect, the first holder includes a cover connected with said top of the first holder and in one aspect the cover is a dome shaped curvate structure.

In another aspect, the inside of the first holder includes a fill material that surrounds and supports the second holder within the first holder.

In a further aspect, the second holder includes a spacer such that the spacer prevents the handle from reaching the bottom of the second holder. In one aspect, the spacer is a pin where the pin is located transverse to the bottom of the second holder and above the bottom of the second holder.

In another aspect, the first holder is cylindrical and in one aspect, the second holder is cylindrical and in another aspect, both the first holder and the second holder are cylindrical. Here as the figures show, the term "cylindrical" describes a form that has a circular top and bottom spaced apart by a length, such as a pipe form, for example only not by way of limitation.

In one aspect, the second holder is configured to hold handles selected from a group consisting of: sand rake handles and golf club handles.

According to another embodiment, a handle holder apparatus consists of a first holder with a top and a bottom and an inside and an outside where the first holder has a first dimension and a first length. A second holder is provided where the second holder includes a top and a bottom and an inside and an outside where the second holder is connected to the first holder and where the second holder has a second dimension and a second length and where the second dimension is smaller than the first dimension of the first holder and where the second length is longer than the first length of the first holder and where the second holder is configured to removably retain a handle on the inside of the second holder. And where the bottom of the second holder extends beyond the bottom of the first holder.

In another aspect, the invention further includes a cover connected with the top of the first holder and in one aspect, the cover is a dome shaped curvate structure.

In one aspect, the inside of the first holder includes a fill material that surrounds and supports the second holder within the first holder.

In a further aspect, the second holder includes a spacer such that the spacer prevents the handle from reaching the bottom of the second holder and in one aspect, the spacer is a pin where the pin is located transverse to the bottom of the second holder and above the bottom of the second holder.

In one aspect, the second holder is configured to hold handles selected from a group consisting of: sand rake handles and golf club handles.

According to another embodiment, a handle holder method consists of:
a. providing a first holder with a top and a bottom and an inside and an outside where the first holder has a first dimension; a second holder where the second holder includes a top and a bottom and an inside and an outside where the second holder is connected to the first holder and where the second holder has a second dimension and where the second dimension is smaller than the first dimension of the first holder and where the second holder is configured to removably retain a handle on the inside of the second holder; and where the bottom of the second holder extends beyond the bottom of the first holder; and b. placing a handle in said second holder.

In one aspect, the method further includes a cover connected with the top of the first holder.

In a further aspect, the second holder includes a spacer such that the spacer prevents the handle from reaching the bottom of the second holder.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF EMBODIMENTS

Figure 1:
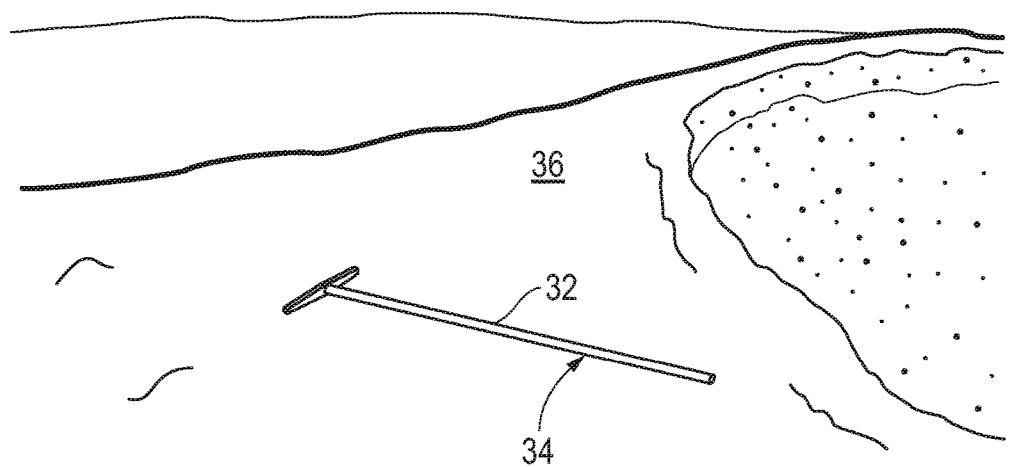
FIG. 1 is a perspective view of the PRIOR ART.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above apparatus and method are also contemplated. For example, further insubstantial approximations of the process and/or method are also considered within the scope of the processes described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

It should also be noted that a plurality of hardware as well as a plurality of different structural components, may be utilized to implement the invention. Furthermore, and as described in subsequent paragraphs, the specific configurations illustrated in the drawings are intended to exemplify embodiments of the invention and that other alternative configurations are possible.

Figure 3:
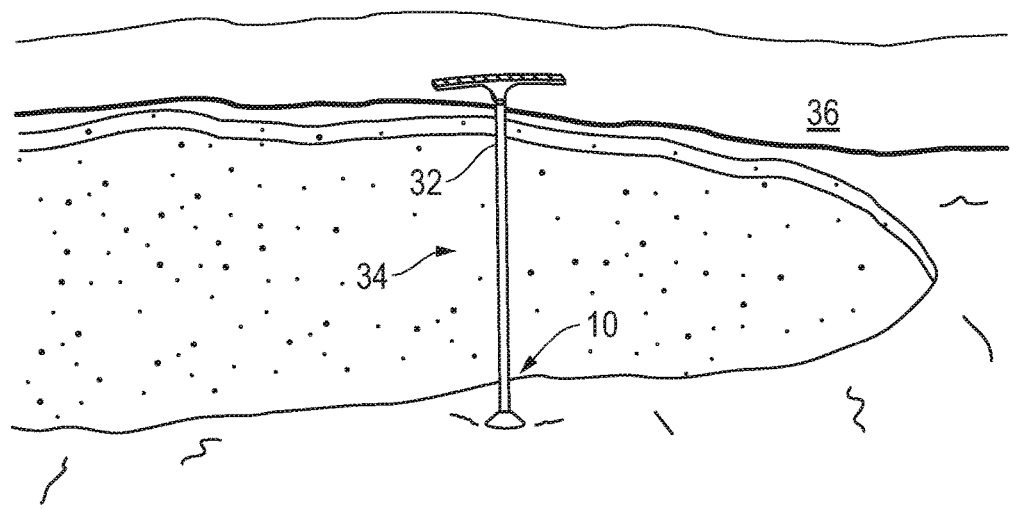
FIG. 3 is a perspective view of the holder in use on a golf course with a rake handle in the holder.
Figure 2:
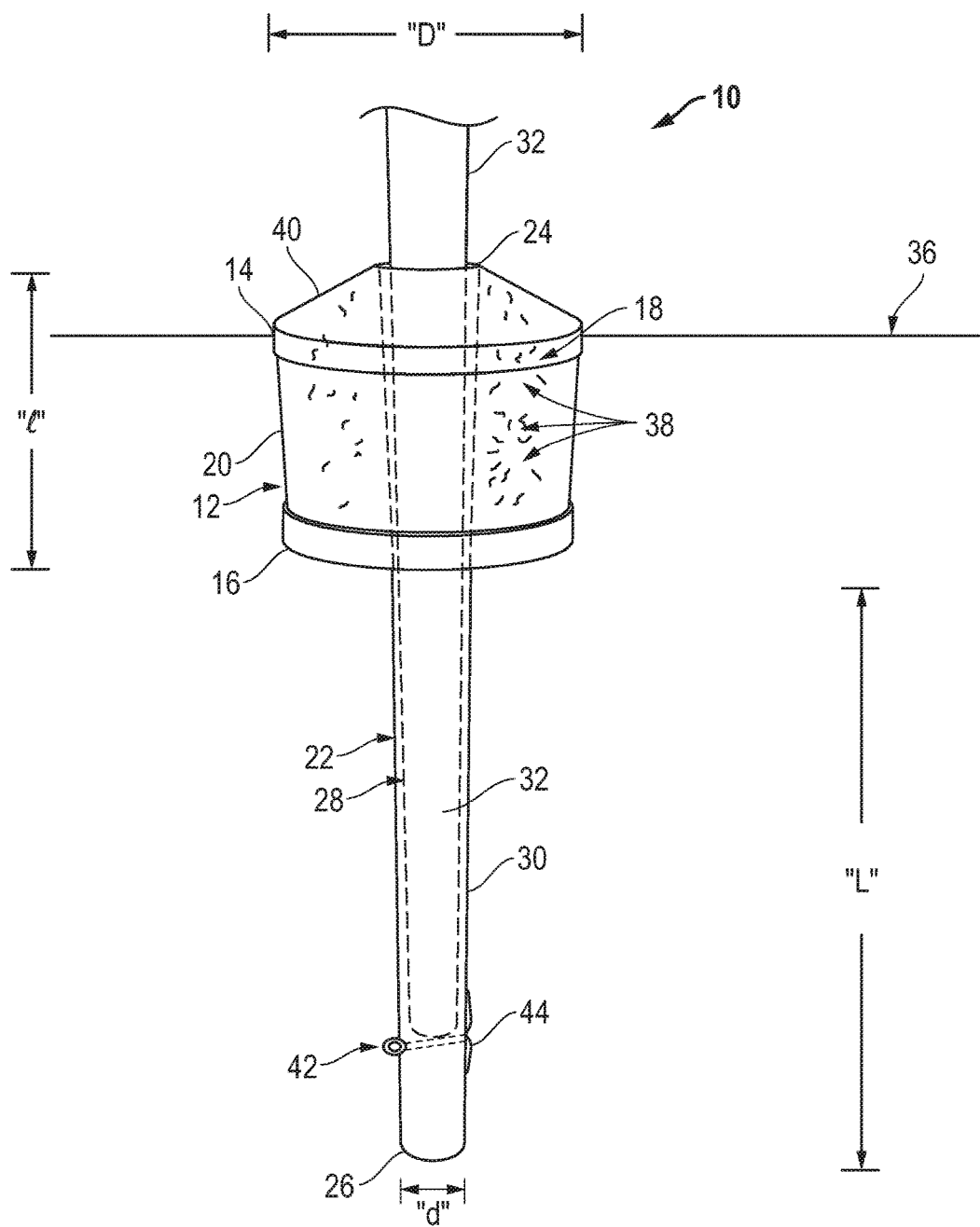
FIG. 2 is a side view of the handle holder.

A preferred embodiment of the present invention is illustrated by way of example in FIGS. 2-3. FIG. 1 illustrates the state of the Prior Art where, for purposes of example only and not by limitation, a rake 34 is left on the ground 36 where it is difficult to see and subject to being run over by the lawn maintenance crews.

Referring to FIG. 2, the handle holder 10 according to a preferred embodiment includes a first holder 12 with a top 14 and a bottom 16 and an inside 18 and an outside 20 and a first dimension "D". A second holder 22 is provided where the second holder 22 includes a top 24 and a bottom 26 and an inside 28 and an outside 30 and a second dimension "d" where the second dimension "d" is smaller than the first dimension "D" of the first holder 12.

Second holder 22 is connected to the first holder 12 on the inside 18 of the first holder 12. The connection may be at the top 14 or the bottom 16 of first holder 12 or at both the top 14 and the bottom 16. First holder 12 may be a solid piece with a hole in the center within which second holder 22 fits so that the entire length of second holder 22 is connected along the length of second holder 22 on the inside 18 of first holder 12. Obviously, first holder 12 and second holder 22 may be integrally formed as a single piece with the same resulting structure as described more fully hereafter.

Further, Applicant has found that filling the inside 18 of first holder 12 with a fill material 38 is a preferred manner of strengthening first holder 12 against damage and in holding and supporting second holder 22 in place on the inside 18 and, even, connecting second holder 22 with first holder 12. Fill material 38 may be plastic foam material or any other fill material now known or hereafter developed.

Importantly, second holder 22 is configured to removably retain a handle 32 on the inside 28 of the second holder 22. Handle 32 may be any type of handle connected with any type of device such as a rake 34, for example only. Further, the bottom 26 of the second holder 22 extends beyond the bottom 16 of the first holder 12. Applicant has found that preferably second holder 22 has a length "L" that is longer than the length "l" of first holder 12, as shown. Second holder 22 could be of the same length as first holder 12 but Applicant's preferred embodiment includes a longer second holder 22 to more securely anchor the invention in the ground and to provide more secure support for handle 32.

Applicant has found that while the top 14 of first holder 12 may be left open, preferably the handle holder 10 includes a cover 40 connected with the top 14 of the first holder 12 and in one aspect the cover 40 is a dome shaped curvate structure as illustrated. The curved, dome shape is preferred as it has been found to allow debris to slide off of the cover 40 thus leaving it exposed and easier to find when a user wishes to replace handle 32 into handle holder 10.

Applicant believes this feature, a structure that leaves the cover 40 uncovered by debris, is an important improvement. Again, for example only, the game of golf is a slow game and anything that speeds up the game is a very sought after improvement. Applicant's handle holder 10 with curvate cover 40 enables a golfer to easily spot the location picked by the golf course managers as the best location for storing a rake 34. The state of the prior art is such that rakes are left all over the place with no particular location set aside. This means, as shown in Prior Art FIG. 1, they are left on the ground and many times interfere with the game by stopping the passage of a golf ball and redirecting the golf ball, sometimes into the very trap the rake is used to repair.

Applicant's invention, again, enables a manager to select a place for the rake 34 and cover 40 enhances the visibility of handle holder 10. Thus Applicant's handle holder 10 ensures that the rake 34 is always in one fixed place and that the place to return the rake 34 after use is known and visible. Visibility may be enhanced further by painting the cover 40 in the "course" colors, for example only.

In a preferred embodiment, second holder 22 includes a spacer 42 such that the spacer 42 prevents the handle 32 from reaching the bottom 26 of the second holder 22. Thus there is an empty space below the handle 32 and the handle 32 is not in direct contact with the ground 36. Thus, preferably, a hole longer than the handle holder 10 is dug or drilled in the ground 36 and handle holder 10 is then placed in the ground 39 such that the top 14 of first holder 12 is just at ground level and the bottom 26 of holder 22 is not in contact with the ground 36 either. This structure, including spacer 42, prevents handle 32 from rotting or becoming soiled, etc. In one aspect, the spacer 42 is a pin 44, such as a "cotter" pin as shown, where the pin 44 is located transverse to, across, the length "L" at or near the bottom 26 of the second holder 22, as just described, and above the bottom 26 of the second holder 22.

By way of continued description, the structure of a preferred embodiment as shown and described includes a first holder 12 with a large dimension "D" or width and a small length "1" when compared to second holder 22. The large width or "D" stabilizes the handle holder 10 when placed in the ground 36 and creates a more visible surface, especially with cover 40. When curved, as shown, cover 40 sloughs off leaves, sand, dirt etc. and remains visible automatically.

The present invention provides an above ground storage for sand trap rakes (and while the rake is being used, for a golf club); a device for keeping the handle clean for use; with the cover it identifies the location for the rake to be placed that is a visible and permanent location; that prevents the rakes from being destroyed by golf carts and lawn mowers (thus reducing expenses); and that prevents the handle from rotting on and/or in the ground.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. A handle holder apparatus comprising:
   a. a handle;
   b. a first holder with a top and a bottom and an inside and an outside wherein said first holder has a first dimension;
   c. a second holder wherein said second holder includes a top and a bottom and an inside and an outside wherein said second holder is connected to the first holder and wherein said second holder has a second dimension and wherein said second dimension is smaller than said first dimension of said first holder and wherein said second holder is configured to removably retain a handle on the inside of the second holder wherein said handle is selected from one of the group consisting of: sand rake handles and golf club handles;
   d. wherein the bottom of the second holder extends beyond the bottom of the first holder, and
   e. a spacer, wherein said spacer is connected with the second holder across the inside of the second holder such that the spacer does not contact the first holder and such that the handle is supported adjacent to and above the bottom of the second holder by said spacer and said spacer prevents a handle from reaching the bottom of second holder, wherein said inside of said first holder includes a fill material that surrounds and supports said second holder within said first holder.

2. The apparatus of claim 1 wherein the spacer is a pin wherein said pin is located transverse to said bottom of said second holder, passing from the outside across the inside and to the outside of said second holder without contacting said first holder, and above said bottom of said second holder.

3. The apparatus of claim 1 wherein said first holder is cylindrical.

4. The apparatus of claim 1 wherein the second holder is cylindrical.

5. The apparatus of claim 1 wherein both the first holder and the second holder are cylindrical.

6. The apparatus of claim 1 further including a cover connected with said top of said first holder.

7. The apparatus of claim 6 wherein said cover is a dome shaped curvate structure.

8. A handle holder apparatus comprising:
   a. a handle;
   b. a first holder with a top and a bottom and an inside and an outside wherein said first holder has a first dimension and a first length;
   c. a second holder wherein said second holder includes a top and a bottom and an inside and an outside wherein said second holder is connected to the first holder and wherein said second holder has a second dimension and a second length and wherein said second dimension is smaller than said first dimension of said first holder and wherein said second length is longer than said first length of said first holder and wherein said second holder is configured to removably retain a handle on the inside of the second holder wherein said handle is selected from one of the group consisting of: sand rake handles and golf club handles;
   d. wherein the bottom of the second holder extends beyond the bottom of the first holder; and
   e. a spacer, wherein said spacer is connected with the second holder across the inside of the second holder such that the spacer does not contact the first holder and such that the handle is supported adjacent to and above the bottom of the second holder by said spacer and said spacer prevents a handle from reaching the bottom of said second holder, wherein said inside of said first holder includes a fill material that surrounds and supports said second holder within said first holder.

9. The apparatus of claim 8 wherein said inside of said first holder includes a fill material that surrounds and supports said second holder within said first holder.

10. The apparatus of claim 8 wherein the spacer is a pin wherein said pin is located transverse said bottom of said second holder, passing from the outside across the inside and to the outside of said second holder without contacting said first holder, and above said bottom of said second holder.

11. The apparatus of claim 8 further including a cover connected with said top of said first holder.

12. The apparatus of claim 11 wherein said cover is a dome shaped curvate structure.

13. The apparatus of claim 8 wherein said first holder is cylindrical.

14. The apparatus of claim 8 wherein the second holder is cylindrical.

15. The apparatus of claim 8 wherein both the first holder and the second holder are cylindrical.

\* \* \* \* \*